(12) United States Patent
Hofleitner

(10) Patent No.: US 10,375,198 B2
(45) Date of Patent: Aug. 6, 2019

(54) DAILY COUNTS AND USAGE PROBABILITIES FOR A USER OF AN ONLINE SERVICE

(71) Applicant: Facebook, Inc., Menlo Park, CA (US)

(72) Inventor: Aude Hofleitner, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 36 days.

(21) Appl. No.: 14/285,291

(22) Filed: May 22, 2014

(65) Prior Publication Data

US 2015/0341232 A1  Nov. 26, 2015

(51) Int. Cl.
*G06Q 30/02* (2012.01)
*H04L 29/08* (2006.01)

(52) U.S. Cl.
CPC ............ *H04L 67/303* (2013.01); *H04L 67/02* (2013.01); *H04L 67/22* (2013.01); *H04L 67/306* (2013.01); *H04L 67/2842* (2013.01)

(58) Field of Classification Search
CPC ......... H04L 43/04; H04L 67/22; H04L 29/08; H04L 67/306; H04L 67/303; G06Q 30/02
USPC ........................................................ 707/758
See application file for complete search history.

(56) References Cited

U.S. PATENT DOCUMENTS

| | | | | |
|---|---|---|---|---|
| 6,879,994 B1* | 4/2005 | Matsliach | ........... | G06F 11/3495 709/204 |
| 8,790,168 B1* | 7/2014 | Wolters | .................... | A63F 13/12 463/1 |
| 2003/0004777 A1* | 1/2003 | Phillips | .................. | G06Q 10/04 705/7.28 |
| 2005/0198099 A1* | 9/2005 | Motsinger | ............... | G06F 21/55 709/200 |
| 2006/0265507 A1* | 11/2006 | Banga | ............... | G06F 17/30867 709/228 |
| 2011/0113096 A1* | 5/2011 | Long | ....................... | G06Q 30/02 709/204 |
| 2013/0024901 A1* | 1/2013 | Sharif-Ahmadi | ............................ G06F 17/30017 | 725/114 |
| 2013/0160087 A1* | 6/2013 | Davis | ...................... | H04L 67/22 726/4 |
| 2013/0185245 A1* | 7/2013 | Anderson | .............. | G06Q 50/00 706/52 |
| 2013/0305158 A1* | 11/2013 | Vasquez | ................ | G06F 3/0481 715/733 |
| 2014/0095617 A1* | 4/2014 | Chan | ................ | G06F 17/30085 709/204 |

* cited by examiner

*Primary Examiner* — Douglas B Blair
*Assistant Examiner* — Jonathan A Sparks
(74) *Attorney, Agent, or Firm* — Baker Botts L.L.P.

(57) ABSTRACT

In one embodiment, a method includes, for each of multiple interactions by a user with an online service, collecting: device information describing a device used by the user for the interaction; access information describing how the user accessed the online service for the interaction; and a count value of the interaction. The method further includes determining based on the collected information a historical count value for each of one or more particular combinations of device and access information.

18 Claims, 9 Drawing Sheets

| Device Brand | Device Model | Carrier | Connection Type | Interface | Reweighted Historical Daily Count |
|---|---|---|---|---|---|
| Apple | iPhone 5s | Comcast | Wi-Fi | iOS platform | 31.3 |
| Apple | iPhone 5s | AT&T | Cellular | iOS platform | 193.7 |
| Samsung | Galaxy S5 | Verizon | Cellular | Android platform | 87.5 |

| Device Brand | Device Model | Carrier | Connection Type | Interface | Daily Count |
|---|---|---|---|---|---|
| brand_1 | model_1 | carrier_1 | conn_1 | interface_1 | Count_1 |
| brand_2 | model_2 | carrier_2 | conn_2 | interface_2 | Count_2 |
| brand_3 | model_3 | carrier_3 | conn_3 | interface_3 | Count_3 |
| ⋮ | ⋮ | ⋮ | ⋮ | ⋮ | ⋮ |
| brand_N | model_N | carrier_N | conn_N | interface_N | Count_N |

*FIG. 3*

| Device Brand | Device Model | Carrier | Connection Type | Interface | Daily Count |
|---|---|---|---|---|---|
| Apple | iPhone 5s | Comcast | Wi-Fi | iOS platform | 25 |
| Apple | iPhone 5s | AT&T | Cellular | iOS platform | 57 |
| Samsung | Galaxy S5 | Verizon | Cellular | Android platform | 41 |

*FIG. 4*

| Interface | Time Spent |
|---|---|
| interface_1 | time_spent_1 |
| interface_2 | time_spent_2 |
| interface_3 | time_spent_3 |
| ⋮ | ⋮ |
| interface_M | time_spent_M |

*FIG. 5*

| Interface | Time Spent (min.) |
|---|---|
| iOS platform | 81 |
| Android platform | 29 |

*FIG. 6*

| DC(4) | DC(3) | DC(2) | DC(1) | DC(0) | → | Historical Daily Count (HDC) |
|---|---|---|---|---|---|---|
| 0 | 47 | 13 | 36 | 27 | | 98.6 |

*FIG. 7*

| DC(4) | DC(3) | DC(2) | DC(1) | DC(0) | → | Historical Daily Count (HDC) |
|---|---|---|---|---|---|---|
| 47 | 13 | 36 | 27 | 57 | | 142.5 |

*FIG. 8*

| TS(4) | TS(3) | TS(2) | TS(1) | TS(0) | → | Historical Time Spent (HTS) |
|---|---|---|---|---|---|---|
| 58 | 22 | 51 | 42 | 81 | | 202.8 |

*FIG. 9*

| Interface | Historical Time Spent |
|---|---|
| interface_1 | historical_time_spent_1 |
| interface_2 | historical_time_spent_2 |
| interface_3 | historical_time_spent_3 |
| ⋮ | ⋮ |
| interface_M | historical_time_spent_M |

*FIG. 10*

| Device Brand | Device Model | Carrier | Connection Type | Interface | Historical Daily Count |
|---|---|---|---|---|---|
| brand_1 | model_1 | carrier_1 | conn_1 | interface_1 | historical_daily_count_1 |
| brand_2 | model_2 | carrier_2 | conn_2 | interface_2 | historical_daily_count_2 |
| brand_3 | model_3 | carrier_3 | conn_3 | interface_3 | historical_daily_count_3 |
| ⋮ | ⋮ | ⋮ | ⋮ | ⋮ | ⋮ |
| brand_N | model_N | carrier_N | conn_N | interface_N | historical_daily_count_N |

*FIG. 11*

| Device Brand | Device Model | Carrier | Connection Type | Interface | Reweighted Daily Count |
|---|---|---|---|---|---|
| brand_1 | model_1 | carrier_1 | conn_1 | interface_1 | reweighted_daily_count_1 |
| brand_2 | model_2 | carrier_2 | conn_2 | interface_2 | reweighted_daily_count_2 |
| brand_3 | model_3 | carrier_3 | conn_3 | interface_3 | reweighted_daily_count_3 |
| ⋮ | ⋮ | ⋮ | ⋮ | ⋮ | ⋮ |
| brand_N | model_N | carrier_N | conn_N | interface_N | reweighted_daily_count_N |

*FIG. 12*

| Device Brand | Device Model | Carrier | Connection Type | Interface | Reweighted Historical Daily Count |
|---|---|---|---|---|---|
| Apple | iPhone 5s | Comcast | Wi-Fi | iOS platform | 31.3 |
| Apple | iPhone 5s | AT&T | Cellular | iOS platform | 193.7 |
| Samsung | Galaxy S5 | Verizon | Cellular | Android platform | 87.5 |

*FIG. 13*

| Device Brand | Device Model | Usage Probability |
|---|---|---|
| Apple | iPhone 5s | 0.72 |
| Samsung | Galaxy S5 | 0.28 |

*FIG. 14*

| Carrier | Usage Probability |
|---|---|
| Comcast | 0.10 |
| AT&T | 0.62 |
| Verizon | 0.28 |

*FIG. 15*

DAILY COUNTS AND USAGE PROBABILITIES FOR A USER OF AN ONLINE SERVICE

TECHNICAL FIELD

This disclosure generally relates to determining information associated with a user of an online service.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area network (WLAN) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, one or more computing devices associated with an online service may collect device information, access information, or daily-count values associated with an interaction by a user with the online service. Device information may include a brand or model of a device used to access the online service. Access information may include a carrier, a connection type, or an interface used to access the online service. A count value may provide a measure or indication of an amount of activity or engagement occurring during a particular interaction of a user with an online service. A count value may be based on a number of server requests or a number of application programming interface (API) calls received by an online service from a user's device during an interaction. A count value accumulated over a one-day period of time may be referred to as a daily-count value.

In particular embodiments, a historical daily-count value may be determined from a series of daily-count values, and the historical daily-count value may be associated with a particular combination of device and access information. A historical daily-count value may represent or may be an aggregate of a series of daily-count values and may be calculated as an exponentially weighted sum of the series of daily-count values.

In particular embodiments, one or more computing devices may determine or collect duration information associated with each interaction by a user with an online service. In particular embodiments, duration information may represent a duration of a user's interaction and may be referred to as time-spent information, and a historical time-spent value may be calculated as an exponentially weighted sum of a series of time-spent values. In particular embodiments, daily-count values or historical daily-count values may be scaled, or reweighted, according to a ratio based on time-spent values or historical time-spent values.

From a combination of device information, access information, count values, or time-spent values associated with a user of an online service, one or more usage probabilities may be determined. In particular embodiments, the usage probabilities may be used to determine how many devices (e.g., smartphones) a user has, what is their primary device, or what is their primary carrier.

The embodiments disclosed above are only examples, and the scope of this disclosure is not limited to them. Particular embodiments may include all, some, or none of the components, elements, features, functions, operations, or steps of the embodiments disclosed above.

BRIEF DESCRIPTION OF THE DRAWINGS

FIG. 3 illustrates an example table of device information, access information, and daily-count values.

FIG. 4 illustrates an example table similar to that of FIG. 3 populated with example device information, access information, and daily-count values.

FIG. 5 illustrates an example table of interface information and time-spent information.

FIG. 6 illustrates an example table similar to that of FIG. 5 populated with example interface information and time-spent information.

FIGS. 7-8 each illustrate an example historical daily-count value calculated from a series of example daily-count values.

FIG. 9 illustrates an example historical time-spent value calculated from a series of example time-spent values.

FIG. 10 illustrates an example table of interface information and historical time-spent information.

FIG. 11 illustrates an example table of device information, access information, and historical daily-count values.

FIG. 12 illustrates an example table of device information, access information, and reweighted daily-count values.

FIG. 13 illustrates an example table populated with example device information, access information, and reweighted historical daily-count values.

FIG. 14 illustrates an example table with example device information and usage probabilities.

FIG. 15 illustrates an example table with example carrier information and usage probabilities.

DESCRIPTION OF EXAMPLE EMBODIMENTS

Figure 1:
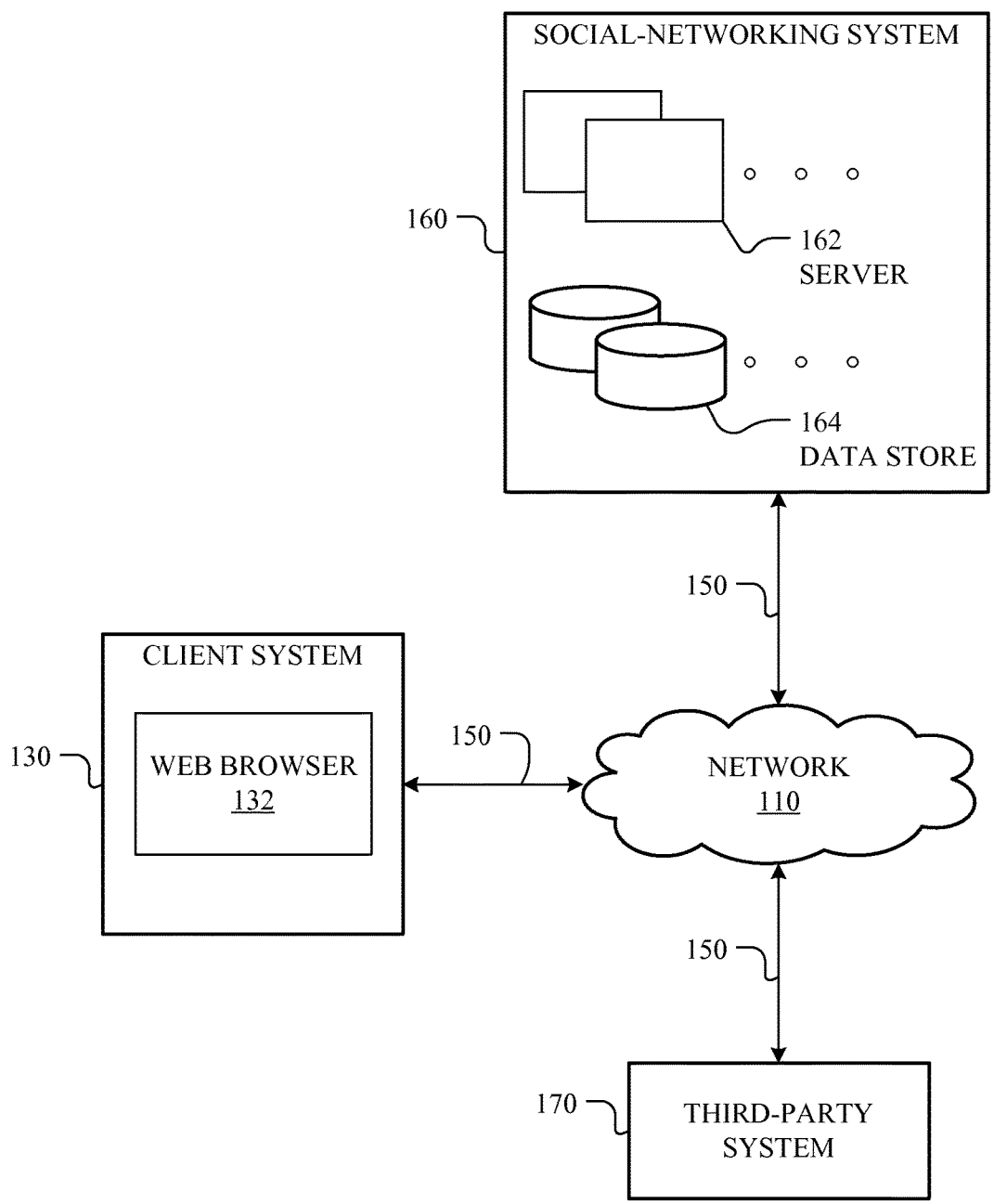
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130. In particular embodiments, a client system 130 may be referred to as a client device 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
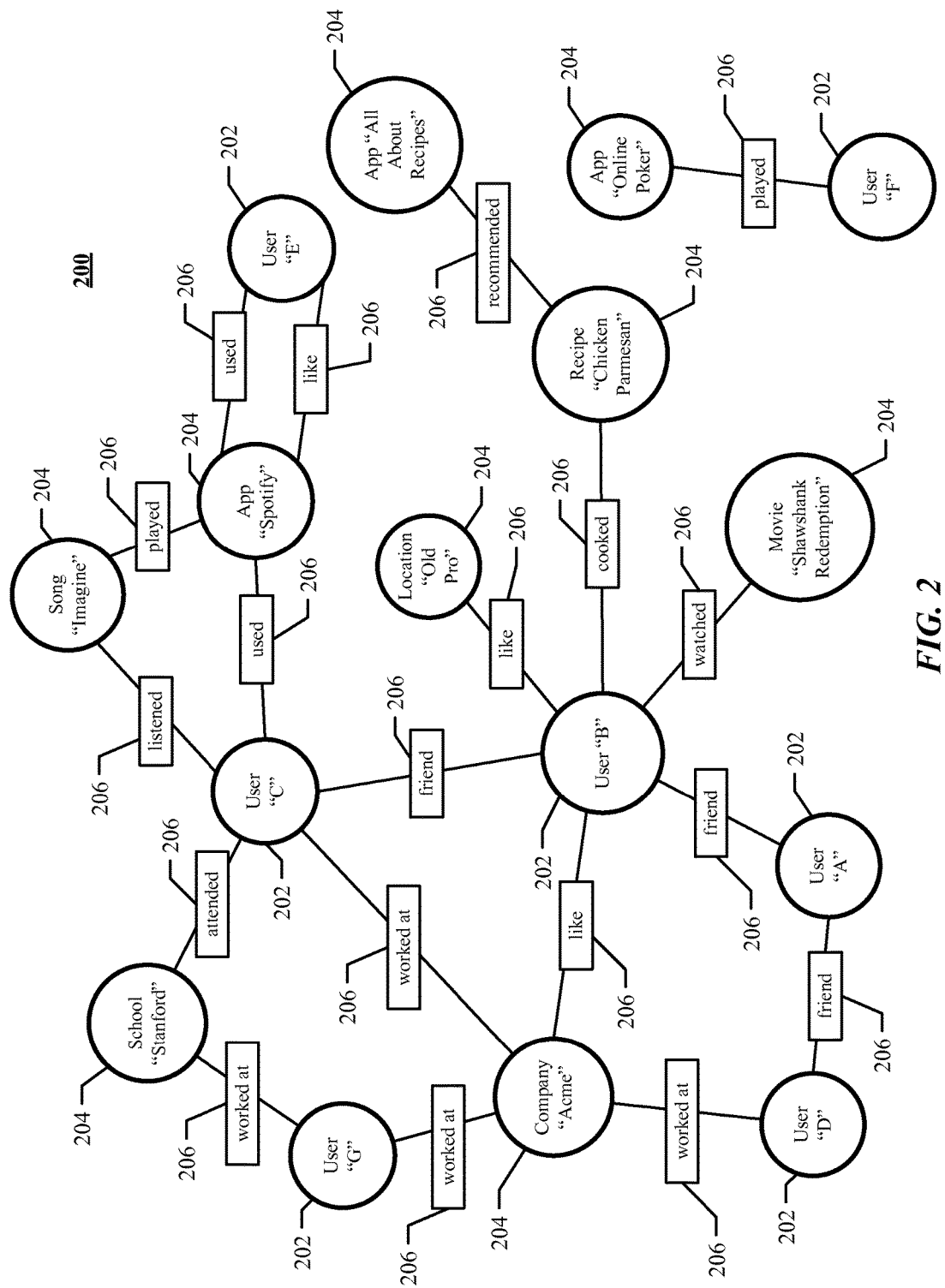
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

FIG. 3 illustrates an example table of device information, access information, and daily-count values. In particular embodiments, the table illustrated in FIG. 3 (and FIGS. 4-15 described below) may be referred to as an information table. In particular embodiments, one or more computing devices may determine or collect device information, access information, or daily-count values associated with an interaction by a user with an online service. In particular embodiments, the example table illustrated in FIG. 3 may represent information collected by one or more computing devices in connection with one or more interactions by a user with an online service. As an example and not by way of limitation, an online service may be an online social network hosted by social-networking system 160, and the user may be a user of social-networking system 160. In particular embodiments, one or more computing devices associated with an online service may generate multiple logs or tables of information similar to the example table of FIG. 3, where each table corresponds to one or more interactions of a particular user with the online service. The example table in FIG. 3 includes N rows of collected information, where N is an integer greater than or equal to 1. In particular embodiments, each of the 1 through N rows in FIG. 3 may correspond to a particular interaction by a user with an online service. In particular embodiments, an interaction by a user may refer to a session that takes place between an online service and a client device 130 associated with a user. Although this disclosure describes and illustrates particular tables having a particular number of rows and including particular device information, access information, or daily-count values, this disclosure contemplates any suitable tables having any suitable number of rows and including any suitable combination of device information, access information, or daily-count values.

In particular embodiments, device information may refer to information describing one or more client devices 130 used by a user for interactions with an online service. In particular embodiments, device information may include a device manufacturer or a device brand of client device 130, such as for example, APPLE, SAMSUNG, NOKIA, or HTC. In particular embodiments, device information may include a device model of client device 130, such as for example, IPHONE 5S, GALAXY S5, LUMIA 920, or HTC ONE. In particular embodiments, device information may include an operating system of client device 130, such as for example IOS, ANDROID, or WINDOWS PHONE. In particular embodiments, device information may include an operating system and operating-system version of client device 130, such as for example IOS 7, ANDROID 4.4 ("KITKAT"), or WINDOWS PHONE 8.1. As an example and not by way of limitation, device information related to a user's interaction with an online service may refer to client device 130 that is a SAMSUNG GALAXY S5 running the ANDROID 4.4 operating system. In the example table of FIG. 3, columns associated with device information include "Device Model" and "Device Brand." Although this disclosure describes and illustrates particular device information associated with particular client devices, this disclosure contemplates any suitable device information associated with any suitable client device.

In particular embodiments, access information may refer to information describing how a user accesses or interacts with an online service. In particular embodiments, access information may include a carrier, network provider, or network operator that provides network 110 or a network connection used by a user's client device 130 to access an online service. As examples and not by way of limitation, carriers, network providers, or network operators may include COMCAST, TIME WARNER CABLE, AT&T U-VERSE, AT&T MOBILITY, SPRINT, VERIZON WIRELESS, ORANGE, CHINA MOBILE, or any other suitable carrier. In particular embodiments, access information may include a connection type used by a user's client device 130 to access a carrier or an online service. As examples and not by way of limitation, a connection type may include one or more links 150, such as for example, DSL, DOCSIS, Wi-Fi, WiMAX, WLAN, a cellular technology-based link, or any suitable combination of any suitable links 150. In particular embodiments, access information may include one or more interfaces, platforms, or client applications used by a user to access or view content from an online service. As examples and not by way of limitation, interfaces, platforms, or client applications used by a user to access an online service may include a web browser (e.g., MICROSOFT INTERNET EXPLORER, MOZILLA FIREFOX, APPLE SAFARI, GOOGLE CHROME, OPERA, or any other suitable web browser) or a special-purpose client application (e.g., FACEBOOK FOR IPHONE, FACEBOOK FOR IPAD, or FACEBOOK FOR ANDROID). Although this disclosure describes and illustrates particular access information associated with how a user accesses an online service, this disclosure contemplates any suitable access information associated with how a user accesses an online service.

FIG. 4 illustrates an example table similar to that of FIG. 3 populated with example device information, access information, and daily-count values. The example table of FIG. 4 includes N=3 rows of collected information, where each of the three rows corresponds to a particular user interaction with an online service. The first and second rows of collected information are associated with an APPLE IPHONE 5S client device 130, and the third row is associated with a SAMSUNG GALAXY S5 client device 130. For each user interaction, one or more computing devices associated with an online service may determine device information, access information, or daily-count values associated with the interaction. As an example and not by way of limitation, the first row of collected information in FIG. 4 indicates that one or more computing devices associated with an online service determined that a particular user interacted with the online service with client device 130 having device brand APPLE and device model IPHONE 5S. The first row also indicates that the interaction used a Wi-Fi connection and network provider COMCAST. The interface, or platform, used for the interaction is an IOS platform, such as for example FACEBOOK FOR IPHONE. The third row of collected information in FIG. 4 indicates that the user used a SAMSUNG GALAXY S5 device and a cellular connection provided by VERIZON to interact with the online service. In particular embodiments, device information, access information, or daily-count values may be collected or logged by one or more servers 162 or other computing devices associated with an online service. Moreover, a table that includes device information, access information, or daily-count values may be stored in one or more data stores 164.

In particular embodiments, a count value may provide a measure or indication of an amount of activity or engagement occurring during a particular interaction of a user with an online service. In particular embodiments, a count value for a particular interaction may be a positive integer that is based on a number of server requests or a number of application programming interface (API) calls received by an online service from client device 130 during the interaction. In particular embodiments, a count value is a number that may correspond to a number of server requests, a number of API calls, or any suitable combination of a number of server requests and a number of API calls. In particular embodiments, a relatively low count value (e.g., 1-10) for a particular interaction may indicate a correspondingly low amount of activity during the interaction. Conversely, a relatively moderate-to-high count value (e.g., 20-100) for an interaction may indicate a moderate-to-high amount of activity or engagement between a user and an online service. Although this disclosure describes and illustrates particular count values determined in particular ways, this disclosure contemplates any suitable count value determined in any suitable way.

In particular embodiments, count values associated with a particular user may be collected, logged, accumulated, or compiled over a particular predetermined period of time. As examples and not by way of limitation, count values may be collected over a time period of approximately 1 hour, 10 hours, 1 day, 5 days, or any suitable time period. A count value that is collected over a one-day time period may be referred to as a daily-count value or, as illustrated in at least FIGS. 3 and 4, a daily count. In the example table of FIG. 4, the first row of collected information indicates an interaction from an APPLE IPHONE 5S over a Wi-Fi connection with an associated daily-count value of 25 for the interaction. In particular embodiments, a series of count values may be collected and logged over successive time periods. As an example and not by way of limitation, a series of daily-count values may be collected on a once-a-day basis. Although this disclosure describes and illustrates particular count values collected over particular periods of time, this disclosure contemplates any suitable count value collected over any suitable period of time.

In particular embodiments, a table of device information, access information, or count values may be associated with a particular user of an online service, and for each unique interaction, a new row of information may be added to the table. In particular embodiments, a unique interaction may refer to an interaction having a unique or particular combination of device and access information. In the example of FIG. 4, the first row of information corresponds to a user interaction using an APPLE IPHONE 5S over a Wi-Fi connection with network provider COMCAST. The second row of information in FIG. 4 represents another interaction using the same device brand and model (APPLE IPHONE 5S) but with a different carrier (AT&T) and connection type (cellular). Even though the first and second rows involve the same device brand and model, the two rows each represent a unique interaction since the carriers and connection types are different.

In particular embodiments, a particular count value may be associated with a particular interaction or session between a user and an online service. As an example and not by way of limitation, the first row of information in FIG. 4 may represent a single interaction having a count value of 25. In other particular embodiments, two or more distinct interactions or sessions between a user and an online service may be represented by a single row of information or a single count value if the two or more distinct interactions have a same combination of device information and access information. As an example and not by way of limitation, two or more interactions may be distinct in that they occur at different times in a day, but the two or more interactions may share the same combination of device information and access information. In the example of FIG. 4, the second row of information may represent two or more interactions that each have the same combination of device information and access information. A user may access an online service with their APPLE IPHONE 5S over an AT&T cellular network in the morning of a particular day, and that interaction may have a count value of 30. Later in the same day, the user may again access the online service in the same manner, and that second interaction may have a count value of 27. Although these two interactions are separate and distinct, they share the same combination of device information and access information, and a computing device collecting this information may combine the two interactions into a single row having a count value of 57, as illustrated in the example of FIG. 4. In yet other particular embodiments, two or more distinct count values may be associated with a single interaction between a user and an online service. As an example and not by way of limitation, a user with an HTC ONE smartphone may be on the street connecting to social-networking system 160 via a Verizon cellular network and then move into a café and join a Wi-Fi network provided by AT&T. In such an example, the user's interaction with social-networking system 160 may represent a single interaction or session, but since the carrier and connection type were changed during the interaction, the interaction may be represented by two rows in an information table, each row having a separate count value. Although this disclosure describes and illustrates particular interactions represented by a particular number of rows or count values in particular information tables, this disclosure contemplates any suitable interactions represented by any suitable number of rows or count values in any suitable information tables.

FIG. 5 illustrates an example table of interface information and time-spent information. In particular embodiments, for each interaction by a user with an online service, one or more computing devices may determine or collect duration information associated with the interaction. In particular embodiments, duration information may represent a duration or an elapsed time of a user's interaction and may be referred to as time-spent information or, as illustrated in the example of FIG. 5, time spent. In particular embodiments, time-spent information may be collected along with interface information, where interface information refers to a platform, interface, or application used in an interaction to access an online service. In particular embodiments, one or more computing devices associated with an online service may generate multiple logs or tables of information similar to the example table of FIG. 5, where each table corresponds to one or more interfaces used by a particular user. In particular embodiments, interface information or time-spent values may be collected or logged by one or more servers 162 or other computing devices associated with an online service. Moreover, the collected information may be stored in one or more data stores 164. The example table in FIG. 5 includes M rows of collected information, where M is an integer greater than or equal to 1. In particular embodiments, each of the 1 through M rows in FIG. 5 may correspond to a particular interface and the time spent interacting with an online service through that interface. Although this disclosure describes and illustrates particular tables with particular interface and time-spent information, this disclosure contemplates any suitable tables with any suitable interface and time-spent information.

FIG. 6 illustrates an example table similar to that of FIG. 5 populated with example interface information and time-spent information. In particular embodiments, for each user interaction, one or more computing devices associated with an online service may determine an interface and a time-spent value to be stored in an information table. In particular embodiments, time-spent information may be collected, recorded, or expressed in any suitable unit of time (e.g., seconds, minutes, or hours) or any suitable arbitrary units (e.g., counts or cycles). In the example of FIG. 6, the time-spent information is expressed in units of minutes. The example table of FIG. 6 includes M=2 rows of collected information, where each of the two rows corresponds to a particular interface used to access an online service. The first row of collected information in FIG. 6 indicates that a user interacted with an online service through an IOS platform (e.g., FACEBOOK FOR IPHONE) for an interaction duration of 81 minutes. In particular embodiments, a row containing interface information and a time-spent value may correspond to one or more interactions of a user with an online service where each interaction used the same interface. As an example and not by way of limitation, the first row of information in FIG. 6 may represent two separate interactions having durations of 38 minutes and 43 minutes, respectively. Each of the two separate interactions may use the same interface (e.g., IOS platform) for an overall time-spent value of 81 minutes for that particular interface. As another example and not by way of limitation, the second row of information in FIG. 6 may represent a single interaction through an ANDROID platform having a duration of 29 minutes.

In particular embodiments, time-spent values associated with a particular user may be collected, logged, accumulated, or compiled over a particular predetermined period of time. As examples and not by way of limitation, time-spent values may be collected over a time period of approximately 1 hour, 10 hours, 1 day, 5 days, or any suitable time period. In particular embodiments, the time period over which time-spent values are accumulated may be the same time period over which count values are accumulated. In particular embodiments, a series of time-spent values may be collected and logged over successive time periods. As an example and not by way of limitation, a series of time-spent values may be collected on a once-a-day basis. Although this disclosure describes and illustrates particular time-spent values collected over particular periods of time, this disclosure contemplates any suitable time-spent value collected over any suitable period of time.

FIGS. 7-8 each illustrate an example historical daily-count (HDC) value calculated from a series of example daily-count (DC) values. In particular embodiments, a series of count values may be collected over any suitable number of successive time periods. In particular embodiments, count values may be collected over a series of 5, 10, 30, 50, 100, or 150 days, or over any suitable number of days. In particular embodiments, a historical daily count represents or is an aggregate of a series of daily-count values that extends 30, 60, 90, or 120 days, or any suitable number of days into the past. The count values illustrated in the examples of FIGS. 7-8 represent daily-count values accumulated over a series of five successive days. Although this disclosure describes and illustrates a particular number of count values collected over a particular number of days, this disclosure contemplates any suitable number of count values collected over any suitable number of days.

In particular embodiments, daily-count values for a series of T days may be stored in an array DC(t), where t is an index value from 0 to T−1 that represents each day of the series. The series in FIGS. 7-8 each represent T=5 days total, and the index t is a value from 0 to 4. In particular embodiments, the daily-count values stored in a particular array may represent the daily-count values for a particular combination of device and access information. As an example and not by way of limitation, the daily-count values illustrated in FIGS. 7-8 may be associated with the second row of accumulated information in FIG. 4 where a user used an APPLE IPHONE 5S and a cellular connection provided by AT&T to interact with an online service. In particular embodiments, the daily-count value for t=0 may represent the most recent daily-count value, while the daily-count value for t=T−1 may represent the daily-count value for the last day in the series. In the example of FIG. 7, DC(0) has a value of 27 and represents the most recent daily-count value, DC(3) has a value of 47 and represents a daily-count value from three days in the past, and DC(4) has a value of 0 and represents the last daily-count value in the series.

In particular embodiments, a historical daily count is a single numeric value that represents or is an aggregate of a series of daily counts. In particular embodiments, a historical daily count may be determined from a weighted sum of a series of associated daily-count values, and the weighted sum may give more weight or emphasis to recent daily-count values and less weight to daily-count values from further in the past. In particular embodiments, a historical daily count may be expressed as $$HDC = \sum_{t=0}^{T-1} w(t) \times DC(t),$$

where w(t) is a weighting function that may decrease as t increases so that recent daily-count values are weighted or favored more heavily than daily-count values from further in the past. In particular embodiments, the weighting function may be a linear function, such as for example $$w(t) = 1 - s\frac{t}{T},$$

where s is a numeric scaling factor. In particular embodiments, the weighting function may be a polynomial function, such as for example $$w(t) = 1 - s\left(\frac{t}{T}\right)^k,$$

where s is a numeric scaling factor and k is a positive integer. In particular embodiments, the weighting function may be an exponential function, such as for example $w(t)=e^{-t/\alpha}$, where $\alpha$ is a time constant for the exponential decay of the weighting function. In particular embodiments, the time constant $\alpha$ may be equal to 1 day, 4 days, 7 days, 10 days, 20 days, or any suitable period of time. For such an exponentially decaying weighting function, a historical daily count may be referred to as an exponentially weighted sum and may be expressed as $$HDC = \sum_{t=0}^{T-1} e^{-t/\alpha} \times DC(t).$$

In the example of FIG. 7, the time constant $\alpha$ is 7 days, and the exponentially weighted sum for HDC is calculated as $27+e^{-1/7} \times 36+e^{-2/7} \times 13+e^{-3/7} \times 47+e^{-4/7} \times 0 \approx 98.6$. Although this disclosure describes and illustrates particular historical daily counts determined with particular weighting functions, this disclosure contemplates any suitable historical daily count determined with any suitable weighting function.

In the example of FIG. 8, the series of daily-count values represents the daily-count values of FIG. 7 shifted over by one day. The historical daily count in FIG. 7 may be from a previous day, while the historical daily count in FIG. 8 may represent information from the current or most recent day. In particular embodiments, a historical daily-count value for a current day may be determined based on the historical daily-count value for a previous day. A historical daily-count value may be determined from the expression $HDC_{current}=DC(\mathbf{0})+e^{-t/\alpha} \times HDC_{previous}$, where $HDC_{current}$ is the historical daily count for the current or most recent day, $HDC_{previous}$ is the historical daily count for the previous day, and DC(0) is the daily count for the current or most recent day. In the example of FIG. 8, the historical daily-count may be calculated as $57+e^{-1/7} \times 98.6 \cong 142.5$. In particular embodiments, one or more computing devices may store a series of T daily-count values, and a historical daily-count value may be calculated from the stored series. In other particular embodiments, one or more computing devices may store the historical daily-count value for a previous day, and the current historical daily-count value may be calculated from the historical daily-count for the previous day and the daily-count value for the most recent day. Although this disclosure describes and illustrates particular historical daily-count values determined in particular ways, this disclosure contemplates any suitable historical daily-count values determined in any suitable ways.

FIG. 9 illustrates an example historical time-spent (HTS) value calculated from a series of example time-spent (TS) values. In particular embodiments, a historical time-spent value is a single numeric value that represents or is an aggregate of a series of time-spent values. Similar to count values discussed above, time-spent values may be collected over any suitable number of successive time periods, such as for example over a series of 5, 10, 30, 50, 100, or 150 days. In particular embodiments, a historical time-spent value may represent or aggregate a series of time-spent values that extends 30, 60, 90, or 120 days, or any suitable number of days into the past. The time-spent values illustrated in the example of FIG. 9 represent time-spent values collected over a series of five successive days. Although this disclosure describes and illustrates a particular number of time-spent values collected over a particular number of days, this disclosure contemplates any suitable number of time-spent values collected over any suitable number of days.

In particular embodiments, time-spent values for a series of T days may be stored in an array TS(t), where t is an index value from 0 to T−1 that represents each day of the series. The series in FIG. 9 represents T=5 days total, and the index t is a value from 0 to 4. In particular embodiments, the time-spent values stored in a particular array may represent the time-spent values for a particular interface, platform, or application used by a user to access an online service. As an example and not by way of limitation, the time-spent values illustrated in FIG. 9 may be associated with the first row of accumulated information in FIG. 6 where a user interacted with an online service using an IOS platform. In particular embodiments, the time-spent value for t=0 may represent the most recent time-spent value, while the time-spent value for t=T−1 may represent the time-spent value for the last day in the series. In the example of FIG. 9, TS(0) has a value of 81 and represents the most recent time-spent value, and TS(4) has a value of 58 and represents the last time-spent value in the series.

In particular embodiments, a historical time-spent value is a single numeric value that represents a series of time-spent values. In particular embodiments, a historical time-spent value may be determined from a weighted sum of a series of associated time-spent values, and the weighted sum may give more weight or emphasis to recent time-spent values and less weight to time-spent values from further in the past. In particular embodiments, a historical time-spent value may be expressed as $$HTS = \sum_{t=0}^{T-1} w(t) \times TS(t),$$

where w(t) is a weighting function that may decrease as t increases. As described above, the weighting function may be a linear function, a polynomial function, an exponential function, or any suitable function. In particular embodiments, the weighting function used to determine a historical time-spent value may be the same weighting function as is used to determine a historical daily-count value. In particular embodiments, the weighting function may be an exponential function, such as for example $w(t)=e^{-t/\alpha}$, where $\alpha$ is a time constant. For such an exponentially decaying weighting function, a historical time-spent value may be expressed as $$HTS = \sum_{t=0}^{T-1} e^{-t/\alpha} \times TS(t).$$

In the example of FIG. 9, the time constant $\alpha$ is 7 days, and the historical time-spent value calculated from the HTS expression is 202.8. Although this disclosure describes and illustrates particular historical time-spent values determined with particular weighting functions, this disclosure contemplates any suitable historical time-spent value determined with any suitable weighting function.

Similar to the discussion above for historical daily-count values, in particular embodiments, a historical time-spent value for a current day may be determined based on a historical daily-count value for a previous day. A historical time-spent value may be determined from the expression $HTS_{current}=T(0)+e^{-1/\alpha} \times HTS_{previous}$, where $HTS_{current}$ is the historical time-spent value for the current or most recent day, $HTS_{previous}$ is the historical time-spent value for the previous day, and TS(0) is the time-spent value for the current or most recent day. In particular embodiments, one or more computing devices may store a series of T time-spent values, and a historical time-spent value may be calculated from the stored series. In other particular embodiments, one or more computing devices may store the historical time-spent value for a previous day, and the current historical time-spent value may be calculated from the historical time-spent value for the previous day and the time-spent value for the most recent day. Although this disclosure describes and illustrates particular historical time-spent values determined in particular ways, this disclosure contemplates any suitable historical time-spent values determined in any suitable ways.

FIG. 10 illustrates an example table of interface information and historical time-spent information. In particular embodiments and as described above, one or more computing devices may determine or collect time-spent information along with interface information. Based on the collected time-spent information, one or more computing devices associated with an online service may generate or store a table of information similar to the example table of FIG. 10, where each table is associated with a particular user and includes one or more interfaces and historical time-spent values. In particular embodiments, the historical time-spent values may be determined from time-spent values as described above. The example table in FIG. 10 includes M rows of information, where M is an integer greater than or equal to 1. In particular embodiments, each of the 1 through M rows in FIG. 10 may correspond to a particular interface used by a user to access an online service and a historical time-spent value associated with that particular interface. As an example and not by way of limitation, the first row of information in the table of FIG. 10 may include interface_1 equal to IOS platform and historical_time_spent_1 equal to 202.8. Although this disclosure describes and illustrates particular tables with particular interface and historical time-spent information, this disclosure contemplates any suitable tables with any suitable interface and historical time-spent information.

FIG. 11 illustrates an example table of device information, access information, and historical daily-count values. In particular embodiments and as described above, one or more computing devices associated with an online service may determine or collect device information, access information, or daily-count values associated with interactions by a user with the online service. Based on the collected information, one or more computing devices may generate or store a table of information similar to the example table of FIG. 11, where each table is associated with a particular user and includes device information, access information, and historical daily-count values. In particular embodiments, historical daily-count values may be determined from daily-count values as described above. The example table in FIG. 11 includes N rows of information, where N is an integer greater than or equal to 1. In particular embodiments, each of the 1 through N rows in FIG. 11 may correspond to a particular combination of device information and access information and a historical daily-count value associated with that particular combination. As an example and not by way of limitation, the first row of information in the table of FIG. 11 may correspond to one or more interactions where a user accessed an online service with an APPLE IPHONE 5S using a Wi-Fi connection and network provider COMCAST, and historical_daily_count_1 is the associated historical daily-count value. Although this disclosure describes and illustrates particular tables with particular device information, access information, and historical time-spent information, this disclosure contemplates any suitable tables with any suitable device information, access information, and historical time-spent information.

FIG. 12 illustrates an example table of device information, access information, and reweighted daily-count values. In particular embodiments, daily-count values or historical daily-count values may be scaled, or reweighted, according to a ratio based on time-spent values or historical time-spent values. In particular embodiments, a daily-count value for an interaction may depend on the interface used for the interaction. As an example and not by way of limitation, daily counts associated with an IOS platform may give different values compared to daily counts associated with an ANDROID platform. In particular embodiments, to account for daily-count values that differ depending on the interface, daily-count values or historical daily-count values may be reweighted based on the time a user spends on a particular interface relative to a total interaction time, or a time spent on all interfaces by the user. In particular embodiments, a daily-count value or a historical daily-count value may be reweighted by multiplying it by a reweighting factor that is a ratio of an associated time-spent value for a particular interface and a sum of time-spent values for all interfaces used by a user. As an example and not by way of limitation, a reweighting factor, $reweight_i$, used to scale a daily-count value $DC_i$ or a historical daily-count value $HDC_i$ may be expressed as $reweight_i = time\_spent_i / \Sigma_{k=1}^{M} time\_spent_k$, where $time\_spent_i$ is a time-spent value for a particular interface and the denominator represents a sum over time-spent values for all platforms used by the user (e.g., all values in the time-spent column of FIG. 5 or 6). From the table of FIG. 6, a reweighting factor for a count value associated with an IOS platform may be calculated as $81/(81+29) \cong 0.74$. As another example and not by way of limitation, a reweighting factor may be expressed as $reweight_i = historical\_time\_spent_i / \Sigma_{k=1}^{M} historical\_time\_spent_k$, where $historical\_time\_spent_i$ is a historical time-spent value for a particular interface and the denominator represents a sum over historical time-spent values for all platforms used by the user (e.g., all values in the historical time-spent column of FIG. 10). Although this disclosure describes and illustrates particular reweighting factors determined in particular ways, this disclosure contemplates any suitable reweighting factor determined in any suitable way.

FIG. 13 illustrates an example table populated with example device information, access information, and reweighted historical daily-count values. In particular embodiments, a reweighted historical daily count may be determined first by calculating a weighted sum of a series of daily-count values (as described above) to determine a historical daily-count value and then by reweighting that value (also described above) to determine a reweighted historical daily-count value. Each row of information in the table of FIG. 13 represents one or more particular interactions of a user with an online service, and each reweighted historical daily count provides a relative measure of the strength or activity level associated with a particular combination of device and access information. In the example of FIG. 13, the interaction with the strongest or highest activity level (e.g., reweighted historical daily count of 193.7) corresponds to the user accessing the online service using an APPLE IPHONE 5S and a cellular connection provided by AT&T.

Previous techniques related to determining a user's activity level associated with device and access information may record the number of times a device is used over a particular time period, such as for example over the past 14 days. Additionally, with previous techniques, in order for a device to be considered active, a user may need to use that device to access an online service at least some particular number of times over that time period, such as for example 3 times over the past 14 days. For such previous techniques, a device or a user's interactions can be missed or not determined accurately. Additionally, such previous techniques may provide inaccurate information related to infrequent users of an online service. Particular embodiments of this disclosure address some of the shortcomings of previous techniques by determining historical count values and reweighted count values as described above. Particular embodiments of this disclosure may provide a robust and accurate determination of a count value and a user's device and access information, and this determination may be valid regardless of whether a user accesses an online service frequently (e.g., on a daily basis) or infrequently (e.g., once a month, or every two months).

FIG. 14 illustrates an example table with example device information and usage probabilities. In particular embodiments, information in a table, such as for example the table of FIG. 13, can be grouped, summed, or combined across various combinations of device and access information. Additionally, the count values in a table can be normalized to determine one or more usage probabilities. In the example of FIG. 14, the information in the table of FIG. 13 was combined across carriers, connection types, and interfaces to produce a table that illustrates usage probability as a function of device brand and model. The first and second rows in FIG. 13 are associated with the same device brand and model (APPLE IPHONE 5S), and so in FIG. 14, those two rows from FIG. 13 are combined to give the first row in FIG. 14. The usage probabilities in FIG. 14 are calculated by normalizing the reweighted historical daily counts from FIG. 13. The usage probability for the first row in FIG. 14 may be calculated from the information in FIG. 13 as $$\frac{31.3 + 193.7}{31.3 + 193.7 + 87.5} = 0.72.$$

The first two daily-count values in FIG. 13 are combined because they both refer to interactions involving the same device brand and model. The denominator is a sum of all daily counts in FIG. 13, and the denominator serves to normalize the usage probabilities so they add up to 1. The usage probability for the second row in FIG. 14 may be calculated as $$\frac{87.5}{31.3 + 193.7 + 87.5} = 0.28.$$

The example table in FIG. 14 illustrates a usage probability of 0.72 (or, 72%) for the APPLE IPHONE 5S and 0.28 (or, 28%) for the SAMSUNG GALAXY S5. The example table in FIG. 14 indicates that a particular user has two devices used to access an online service and that their primary device is an APPLE IPHONE 5S.

FIG. 15 illustrates an example table with example carrier information and usage probabilities. In the example of FIG. 15, the information in the table of FIG. 13 was combined across device brands, device models, connection types, and interfaces to produce a table that illustrates usage probability as a function of carrier. In FIG. 15, the usage probabilities are calculated in a similar manner as discussed above. For example, the probability that the user accesses the online service through COMCAST can be determined from the count values in FIG. 13 as $$\frac{31.3}{31.3 + 193.7 + 87.5} = 0.10.$$

The example table in FIG. 15 illustrates a usage probability of 0.10 for COMCAST, 0.62 for AT&T, and 0.28 for VERIZON. The example table in FIG. 14 indicates that a particular user accesses the online service through three carriers and that their primary carrier is AT&T.

In particular embodiments, information that includes usage probabilities and device or access information (such as for example the tables in FIGS. 14-15) may be used to determine one or more of the following: how many phones a user has; which phone is a user's primary phone; what percentage a user uses a particular phone or a particular carrier; a combination of how much a user uses a particular phone and a particular carrier; a probability of use as a function of device model, network provider, carrier, connection type, or interface; or a probability of use based on any other suitable combination of device information or access information. Additionally, in particular embodiments, information that includes usage probabilities and device or access information (such as for example the tables in FIGS. 14-15) may be related to or combined with a user's social-network information. Such information that includes usage probabilities, device or access information, and social-network information may be used to further understand or predict a user's behavior or to provide tailored advertising to a user. As an example and not by way of limitation, a user's usage-probability information can be compared with their friends' information to determine how many of their friends use the same device or carrier or to predict whether a user may switch devices or carriers based in part on their friends' devices or carriers.

In particular embodiments, information that includes usage probabilities and device or access information (such as for example the tables in FIGS. 14-15) may be relevant to churn or may be applied to churn analysis or a churn-prediction algorithm, where churn refers to a change in a user's device or access information. As an example and not by way of limitation, usage probability and related device or access information can be monitored over time to analyze or predict changes in a user's device or access information. For example, usage-probability information can be used to predict or understand the cause or likelihood of certain events, such as for example, what caused a user to switch to a different device, or how likely is it that a user may switch carriers in the future.

In particular embodiments, information that includes usage probabilities and device or access information (such as for example the tables in FIGS. 14-15) may be used to analyze churn with respect to device information (e.g., device manufacturer, device brand, device operating system) or access information (e.g., carrier, connection type, interface). As an example and not by way of limitation, churn analysis could enable an understanding of which features related to device or access information are likely causing churn. For example, if a population or group of users switches their devices or carriers, the usage probabilities and device or access information for the users could be analyzed to understand a likely cause of the switch. Additionally, in particular embodiments, churn analysis could also be combined with social-networking information. As an example and not by way of limitation, if a group of users switches their devices or carriers, the usage probabilities and device or access information along with the social-networking information for the users could be analyzed to understand what may have caused the switch. For example, if a user switches to a new primary device, churn analysis could reveal that a certain number or percentage of the user's friends had previously switched to that same device over the past few weeks or months. In particular embodiments, churn analysis to understand a likely cause of past changes could be applied to current users and used to predict a likelihood or probability of future changes. As an example and not by way of limitation, if a certain number or percentage of a particular user's friends have made a switch to a different device, then churn analysis could provide a probability that the user will switch their device over the next few weeks or months.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system context directed to the user. As an example and not by way of limitation, an advertisement may display information about a friend of the user within social-networking system 160 who has taken an action associated with the subject matter of the advertisement.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

In particular embodiments, information that includes usage probabilities and device or access information (such as for example the tables in FIGS. 14-15) may be used to provide tailored or targeted advertising. As an example and not by way of limitation, when a user's primary device or primary carrier is determined, a targeted advertisement related to upgrading their device (e.g., from IPHONE 5 to IPHONE 6) or switching carriers could be sent to the user. In particular embodiments, information that includes usage probabilities and device or access information may be combined with social-networking information or churn analysis to provide tailored or targeted advertising. As an example and not by way of limitation, targeted advertisements for a device or carrier could be sent to a user based on what the user's friends are using. For example, if a user has an IPHONE 5 and her friends have recently switched to an HTC ONE, then advertisements related to switching to an HTC ONE could be sent to the user. Although this disclosure describes particular targeted advertisements based on particular device or access information or particular social-networking information, this disclosure contemplates any suitable targeted advertisements based on any suitable device or access information or any suitable social-networking information.

Figure 16:
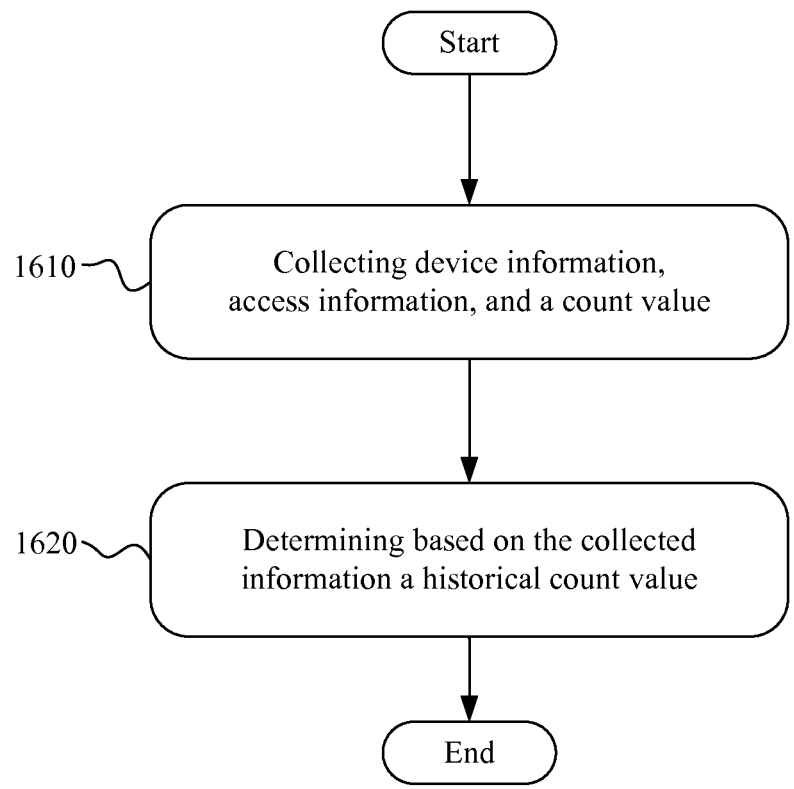
FIG. 16 illustrates an example method for determining information associated with a user of an online service.

FIG. 16 illustrates an example method 1600 for determining information associated with a user of an online service. The method may begin at step 1610, where for each interaction of multiple interactions by a user with an online service, one or more computing devices may collect device information, access information, and a count value of the interaction. In particular embodiments, the device information may describe a device used by the user for the interaction, and the access information may describe how the user accessed the online service for the interaction. At step 1620, one or more computing devices may determine based on the collected information a historical count value for each of one or more particular combinations of device and access information, at which point the method may end. Particular embodiments may repeat one or more steps of the method of FIG. 16, where appropriate. Although this disclosure describes and illustrates particular steps of the method of FIG. 16 as occurring in a particular order, this disclosure contemplates any suitable steps of the method of FIG. 16 occurring in any suitable order. Moreover, although this disclosure describes and illustrates an example method for determining information associated with a user of an online service including the particular steps of the method of FIG. 16, this disclosure contemplates any suitable method for determining information associated with a user of an online service including any suitable steps, which may include all, some, or none of the steps of the method of FIG. 16, where appropriate. Furthermore, although this disclosure describes and illustrates particular components, devices, or systems carrying out particular steps of the method of FIG. 16, this disclosure contemplates any suitable combination of any suitable components, devices, or systems carrying out any suitable steps of the method of FIG. 16.

Figure 17:
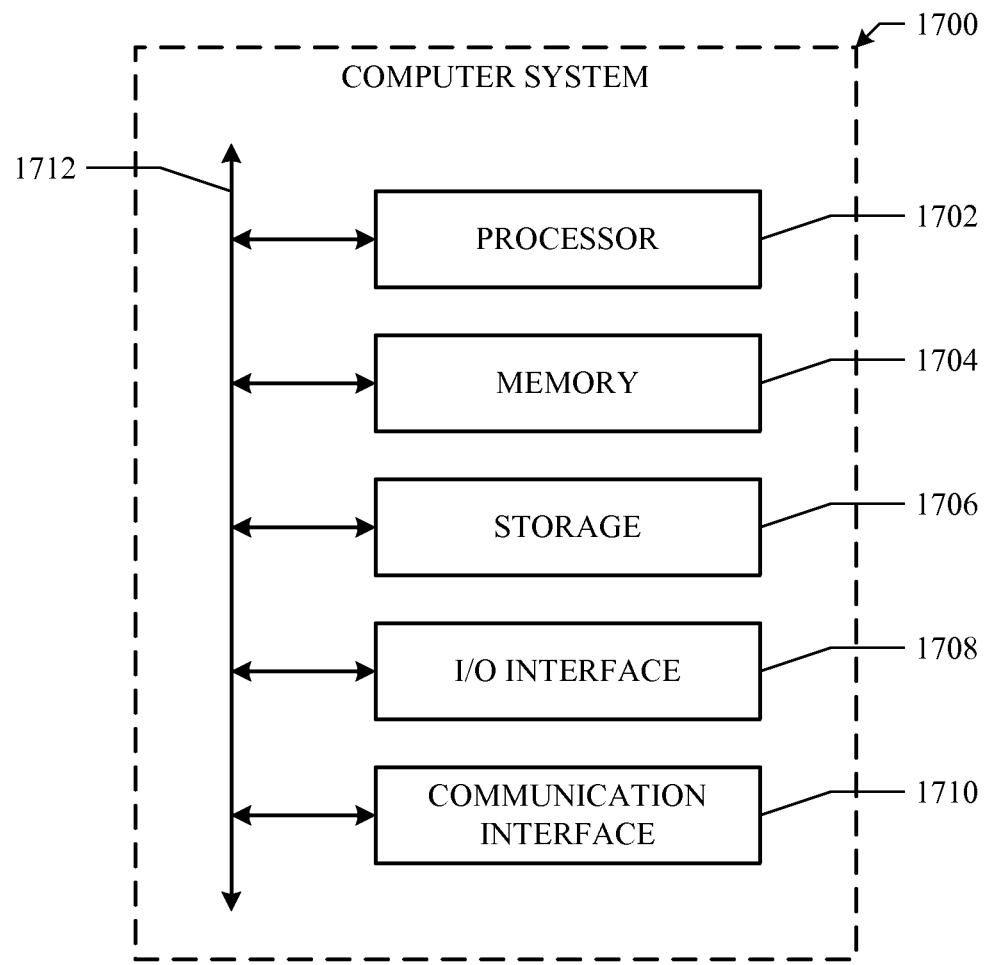
FIG. 17 illustrates an example computer system.

FIG. 17 illustrates an example computer system 1700. In particular embodiments, one or more computer systems 1700 perform one or more steps of one or more methods described or illustrated herein. In particular embodiments, one or more computer systems 1700 provide functionality described or illustrated herein. In particular embodiments, software running on one or more computer systems 1700 performs one or more steps of one or more methods described or illustrated herein or provides functionality described or illustrated herein. Particular embodiments include one or more portions of one or more computer systems 1700. Herein, reference to a computer system may encompass a computing device, and vice versa, where appropriate. Moreover, reference to a computer system may encompass one or more computer systems, where appropriate.

This disclosure contemplates any suitable number of computer systems 1700. This disclosure contemplates computer system 1700 taking any suitable physical form. As example and not by way of limitation, computer system 1700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1700 may include one or more computer systems 1700; be unitary or distributed; span multiple locations; span multiple machines; span multiple data centers; or reside in a cloud, which may include one or more cloud components in one or more networks. Where appropriate, one or more computer systems 1700 may perform without substantial spatial or temporal limitation one or more steps of one or more methods described or illustrated herein. As an example and not by way of limitation, one or more computer systems 1700 may perform in real time or in batch mode one or more steps of one or more methods described or illustrated herein. One or more computer systems 1700 may perform at different times or at different locations one or more steps of one or more methods described or illustrated herein, where appropriate.

In particular embodiments, computer system 1700 includes a processor 1702, memory 1704, storage 1706, an input/output (I/O) interface 1708, a communication interface 1710, and a bus 1712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1702 includes hardware for executing instructions, such as those making up a computer program. As an example and not by way of limitation, to execute instructions, processor 1702 may retrieve (or fetch) the instructions from an internal register, an internal cache, memory 1704, or storage 1706; decode and execute them; and then write one or more results to an internal register, an internal cache, memory 1704, or storage 1706. In particular embodiments, processor 1702 may include one or more internal caches for data, instructions, or addresses. This disclosure contemplates processor 1702 including any suitable number of any suitable internal caches, where appropriate. As an example and not by way of limitation, processor 1702 may include one or more instruction caches, one or more data caches, and one or more translation lookaside buffers (TLBs). Instructions in the instruction caches may be copies of instructions in memory 1704 or storage 1706, and the instruction caches may speed up retrieval of those instructions by processor 1702. Data in the data caches may be copies of data in memory 1704 or storage 1706 for instructions executing at processor 1702 to operate on; the results of previous instructions executed at processor 1702 for access by subsequent instructions executing at processor 1702 or for writing to memory 1704 or storage 1706; or other suitable data. The data caches may speed up read or write operations by processor 1702. The TLBs may speed up virtual-address translation for processor 1702. In particular embodiments, processor 1702 may include one or more internal registers for data, instructions, or addresses. This disclosure contemplates processor 1702 including any suitable number of any suitable internal registers, where appropriate. Where appropriate, processor 1702 may include one or more arithmetic logic units (ALUs); be a multi-core processor; or include one or more processors 1702. Although this disclosure describes and illustrates a particular processor, this disclosure contemplates any suitable processor.

In particular embodiments, memory 1704 includes main memory for storing instructions for processor 1702 to execute or data for processor 1702 to operate on. As an example and not by way of limitation, computer system 1700 may load instructions from storage 1706 or another source (such as, for example, another computer system 1700) to memory 1704. Processor 1702 may then load the instructions from memory 1704 to an internal register or internal cache. To execute the instructions, processor 1702 may retrieve the instructions from the internal register or internal cache and decode them. During or after execution of the instructions, processor 1702 may write one or more results (which may be intermediate or final results) to the internal register or internal cache. Processor 1702 may then write one or more of those results to memory 1704. In particular embodiments, processor 1702 executes only instructions in one or more internal registers or internal caches or in memory 1704 (as opposed to storage 1706 or elsewhere) and operates only on data in one or more internal registers or internal caches or in memory 1704 (as opposed to storage 1706 or elsewhere). One or more memory buses (which may each include an address bus and a data bus) may couple processor 1702 to memory 1704. Bus 1712 may include one or more memory buses, as described below. In particular embodiments, one or more memory management units (MMUs) reside between processor 1702 and memory 1704 and facilitate accesses to memory 1704 requested by processor 1702. In particular embodiments, memory 1704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1704 may include one or more memories 1704, where appropriate. Although this disclosure describes and illustrates particular memory, this disclosure contemplates any suitable memory.

In particular embodiments, storage 1706 includes mass storage for data or instructions. As an example and not by way of limitation, storage 1706 may include a hard disk drive (HDD), a floppy disk drive, flash memory, an optical disc, a magneto-optical disc, magnetic tape, or a Universal Serial Bus (USB) drive or a combination of two or more of these. Storage 1706 may include removable or non-removable (or fixed) media, where appropriate. Storage 1706 may be internal or external to computer system 1700, where appropriate. In particular embodiments, storage 1706 is non-volatile, solid-state memory. In particular embodiments, storage 1706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1706 taking any suitable physical form. Storage 1706 may include one or more storage control units facilitating communication between processor 1702 and storage 1706, where appropriate. Where appropriate, storage 1706 may include one or more storages 1706. Although this disclosure describes and illustrates particular storage, this disclosure contemplates any suitable storage.

In particular embodiments, I/O interface 1708 includes hardware, software, or both, providing one or more interfaces for communication between computer system 1700 and one or more I/O devices. Computer system 1700 may include one or more of these I/O devices, where appropriate. One or more of these I/O devices may enable communication between a person and computer system 1700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1708 for them. Where appropriate, I/O interface 1708 may include one or more device or software drivers enabling processor 1702 to drive one or more of these I/O devices. I/O interface 1708 may include one or more I/O interfaces 1708, where appropriate. Although this disclosure describes and illustrates a particular I/O interface, this disclosure contemplates any suitable I/O interface.

In particular embodiments, communication interface 1710 includes hardware, software, or both providing one or more interfaces for communication (such as, for example, packet-based communication) between computer system 1700 and one or more other computer systems 1700 or one or more networks. As an example and not by way of limitation, communication interface 1710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1710 for it. As an example and not by way of limitation, computer system 1700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1700 may include any suitable communication interface 1710 for any of these networks, where appropriate. Communication interface 1710 may include one or more communication interfaces 1710, where appropriate. Although this disclosure describes and illustrates a particular communication interface, this disclosure contemplates any suitable communication interface.

In particular embodiments, bus 1712 includes hardware, software, or both coupling components of computer system 1700 to each other. As an example and not by way of limitation, bus 1712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1712 may include one or more buses 1712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by one or more computing devices of an online service, receiving a communication from a particular mobile client device, wherein:
the particular mobile client device is associated with a particular user of the online service; and
the communication comprises:
device information identifying the particular mobile client device; and
access information describing a particular access method, from a plurality of access methods, used by the particular mobile client device to access the online service;
by one or more computing devices, in response to receiving the communication, updating a table associated with the particular user, wherein the table comprises:
device information and access information for a plurality of communication interactions between the particular user and the online service; and
a count value of each of the communication interactions;
by one or more computing devices, determining based on the table a reweighted count value for each of one or more particular combinations of mobile client device and access method, wherein the reweighted count value for a particular combination of mobile client device and access method represents a combination of a count of accessing the online service and an amount of time spent on the online service over a predetermined period of time;
by one or more computing devices, based on the reweighted count value, determining a usage probability for each combination of mobile client device and access method for the particular user;
by one or more computing devices, based on the usage probabilities for the combination of mobile client devices and access methods from the plurality of interactions, selecting a primary mobile client device and a primary access method of the particular user;
by one or more computing devices, selecting a group of other users, wherein each user in the group of other users are connections of the particular user on an online social network, and each user in the group of other users are respectively associated with a primary mobile client device and a primary access method;
by one or more computing devices, based on the primary mobile client device and primary access method determined for each user in the group of other users, determining a probability that the primary mobile client device or the primary access method of the particular user will change; and
by one or more computing devices, sending a message to the particular mobile client device, wherein the message is based on the probability and the primary mobile client devices and primary access methods of the particular user and the group of other users.

2. The method of claim 1, wherein the device information describing the particular mobile client device used by the particular user for the interaction comprises:
a brand of the particular mobile client device; and
a model of the particular mobile client device.

3. The method of claim 1, wherein the access information describing how the particular user accessed the online service for each of the communication interactions comprises:
a platform used by the particular user for the communication interaction;
a carrier that provided a network connection for the communication interaction; and
a connection type of the network connection.

4. The method of claim 3, wherein the updating the table further comprises:
for each of the communication interactions by the particular user with the online service, collecting duration information indicating a duration of the communication interaction; and
determining based at least in part on the collected duration information a historical time-spent value for each platform used by the particular user.

5. The method of claim 4, wherein a historical time-spent value for a particular platform used by the particular user is determined from an exponentially weighted sum of a collected duration associated with the particular platform and one or more previously collected durations associated with the particular platform.

6. The method of claim 1, wherein a reweighted count value for a particular combination of device and access information is expressed as $$RWC_i = C_i \times \frac{t_i}{\sum_{k=1}^{M} t_k},$$

wherein:
$RWC_i$ is the reweighted count value for i-th combination of device and access information;
$C_i$ is a count value for i-th combination of device and access information for the predetermined period of time;
$t_i$ is an amount of time the particular user spent for i-th combination of device and access information for the predetermined period of time;
M is a total number of combinations of device and access information for the particular user.

7. The method of claim 1, wherein the device information, access information, and count value for the plurality of communication interactions in the table are collected over the predetermined period of time.

8. The method of claim 1, wherein the count value of each of the communication interactions equals a number of server requests or application programming interface (API) calls that are received from a client device used by the particular user for the communication interaction and that occur over the predetermined period of time.

9. The method of claim 1, wherein:
the predetermined period of time is one day; and
the count value is a daily-count value.

10. One or more computer-readable non-transitory storage media embodying software that is operable when executed to:
receive a communication from a particular mobile client device, wherein:
the particular mobile client device is associated with a particular user of the online service; and
the communication comprises:
device information identifying the particular mobile client device; and
access information describing a particular access method, from a plurality of access methods, used by the particular mobile client device to access the online service;
in response to receiving the communication, update a table associated with the particular user, wherein the table comprises:
device information and access information for a plurality of communication interactions between the particular user and the online service; and
a count value of each of the communication interactions;
determine based on the table a reweighted count value for each of one or more particular combinations of mobile client device and access method, wherein the reweighted count value for a particular combination of mobile client device and access method represents a combination of a count of accessing the online service and an amount of time spent on the online service over a predetermined period of time;
based on the reweighted count value, determine a usage probability for each combination of mobile client device and access method for the particular user;
based on the usage probabilities for the combination of mobile client devices and access methods from the plurality of interactions, select a primary mobile client device and a primary access method of the particular user;
select a group of other users, wherein each user in the group of other users are connections of the particular user on an online social network, and each user in the group of other users are respectively associated with a primary mobile client device and a primary access method;
based on the primary mobile client device and primary access method determined for each user in the group of other users, determine a probability that the primary mobile client device or the primary access method of the particular user will change; and
send a message to the particular mobile client device, wherein the message is based on the probability and the primary mobile client devices and primary access methods of the particular user and the group of other users.

11. The media of claim 10, wherein the device information describing the particular mobile client device used by the particular user for the interaction comprises:
a brand of the particular mobile client device; and
a model of the particular mobile client device.

12. The media of claim 10, wherein the access information describing how the particular user accessed the online service for each of the communication interactions comprises:
a platform used by the particular user for the communication interaction;
a carrier that provided a network connection for the communication interaction; and
a connection type of the network connection.

13. The media of claim 10, wherein the software is further operable when executed to update the table by:
for each of the communication interactions by the particular user with the online service, collect duration information indicating a duration of the communication interaction; and
determine based at least in part on the collected duration information a historical time-spent value for each platform used by the particular user.

14. The media of claim 10, wherein a reweighted count value for a particular combination of device and access information is expressed as $RWC_i = C_i \times$, wherein:
$RWC_i$ is the reweighted count value for i-th combination of device and access information;
$C_i$ is a count value for i-th combination of device and access information for the predetermined period of time;
$t_i$ is an amount of time the particular user spent for i-th combination of device and access information for the predetermined period of time;
M is a total number of combinations of device and access information for the particular user.

15. The media of claim 10, wherein the count value of each of the communication interactions equals a number of server requests or application programming interface (API) calls that are received from a client device used by the particular user for the communication interaction and that occur over the predetermined period of time.

16. A system comprising:
one or more processors; and
a memory coupled to the processors comprising instructions executable by the processors, the processors being operable when executing the instructions to:
receive a communication from a particular mobile client device, wherein:
the particular mobile client device is associated with a particular user of the online service; and
the communication comprises:
device information identifying the particular mobile client device; and
access information describing a particular access method, from a plurality of access methods, used by the particular mobile client device to access the online service;
in response to receiving the communication, update a table associated with the particular user, wherein the table comprises:
device information and access information for a plurality of communication interactions between the particular user and the online service; and
a count value of each of the communication interactions;
determine based on the table a reweighted count value for each of one or more particular combinations of mobile client device and access method, wherein the reweighted count value for a particular combination of mobile client device and access method represents a combination of a count of accessing the online service and an amount of time spent on the online service over a predetermined period of time;
based on the reweighted count value, determine a usage probability for each combination of mobile client device and access method for the particular user;
based on the usage probabilities for the combination of mobile client devices and access methods from the plurality of interactions, select a primary mobile client device and a primary access method of the particular user;

select a group of other users, wherein each user in the group of other users are connections of the particular user on an online social network, and each user in the group of other users are respectively associated with a primary mobile client device and a primary access method;

based on the primary mobile client device and primary access method determined for each user in the group of other users, determine a probability that the primary mobile client device or the primary access method of the particular user will change; and send a message to the particular mobile client device, wherein the message is based on the probability and the primary mobile client devices and primary access methods of the particular user and the group of other users.

17. The media of claim 13, wherein a historical time-spent value for a particular platform used by the particular user is determined from an exponentially weighted sum of a collected duration associated with the particular platform and one or more previously collected durations associated with the particular platform.

18. The media of claim 10, wherein the device information, access information, and count value for the plurality of communication interactions in the table are collected over the predetermined period of time.

* * * * *